May 7, 1957 L. R. JONES ET AL 2,791,633

REMOTE DICTATION SYSTEM

Filed June 27, 1955 2 Sheets-Sheet 1

INVENTORS
Lloyd R. Jones
Rudolf E. Freund
BY
Curtis Morris + Safford
ATTORNEYS

REMOTE DICTATION SYSTEM

Filed June 27, 1955 2 Sheets-Sheet 2

INVENTORS
Lloyd R. Jones
Rudolf E. Freund
BY
Curtis, Morris & Safford
ATTORNEYS

United States Patent Office 2,791,633
Patented May 7, 1957

2,791,633

REMOTE DICTATION SYSTEM

Lloyd R. Jones and Rudolf E. Freund, Bridgeport, Conn., assignors to Dictaphone Corporation, Bridgeport, Conn., a corporation of New York Application June 27, 1955, Serial No. 518,128

15 Claims. (Cl. 179—6)

This invention relates to office-type dictation systems wherein any one of a number of remotely-located dictating stations is connectible to centrally-located recording apparatus. More paticularly, this invention relates to such systems in which the sound signals are transmitted from the remote stations to the recording apparatus through conventional telephone switchboard equipment.

Such a dictation system normally will include many components which have been in use for some time, e. g. automatic telephone switchboard equipment, a recording machine with its associated recording head, control devices and drive mechanisms, etc. To simplify the showing herein, such components are not described in detail, but are referred to briefly where such a reference is deemed to aid in clarifying the principles of the present invention. For further information on certain of the components forming part of the system described herein, reference may be made to U. S. patent applications Serial Nos. 250,122, 279,744, and 457,165, filed, respectively, on October 6, 1951, April 1, 1952, and September 20, 1954, by D. E. Taylor and L. R. Jones as joint inventors.

Many dictation systems commonly in use now include telephone-type desksets which serve as remote dictating stations, and which are provided with a number of push-button switches so arranged that the dictator may remotely control the desired functions (e. g. clutch-operate, playback, correction mark, etc.) at the central recording machine. The sound and control signals are transmitted from these stations to the recording machine by separate cables, e. g. four-wire or six-wire, which are installed in the office building at some considerable expense.

As is well known, a large number of office buildings have private switchboard equipment, either automatic or manual, for use with the conventional dial telephones provided for inter-office and outside communication. Since this equipment already is available, it is desirable to use it as part of the dictation system, and thereby simplify and reduce the costs of the system. Preferably, the remote dictator should be able to use his conventional telephone both for communication purposes and also for dictating to the central recording machine. With such an arrangement, the dictator may obtain a line to the recording machine, for example, simply by dialing a code number; the desired control functions (clutch-operate, playback, etc.) may then be obtained by dialing other code numbers once the dictator has taken command of the recording machine.

All conventional automatic dial switchboards include switching devices which are responsive to the dial impulses transmitted by the calling station, and which establish certain connections in accordance with the number of impulses received. Some switchboards employ a device of this nature referred to as a "selector," which is arranged to establish a direct metallic connection between the calling party and the selected trunk or line. Thus, if a remote dictation system is to be installed in an office having such a switchboard, the central recording machine and its associated control equipment may be connected to one of the spare "levels" in the selector and the remote dictator may obtain a direct connection to the dictating machine by dialing the proper code number. Furthermore, dial impulses from the calling station are readily transmitted over this direct connection for the purpose of activating the recording machine control equipment as desired.

An important practical problem, however, stems from the fact that a vast majority of privately-owned switchboards do not use "selectors." The automatic switching function in these switchboards is performed by a dial pulse-responsive device referred to as a "connector." For the present purposes, the significant characteristic of a "connector" is that the connection it establishes between the calling party and the selected line is not a direct metallic one but one which includes series capacitance. This series capacitance greatly distorts any dial impulse transmitted through the switchboard, e. g. for purposes of controlling the central recording machine, and blocks off the direct-current component of such control signals.

Dial impulses are created in a dial telephone by interrupting the flow of talking current between the telephone and the switchboard, the number of interruptions in a train of impulses being determined by the number dialed. The dialing device typically is so arranged that each interruption lasts approximately 40 milliseconds, with an "on time" between interruptions of approximately 60 milliseconds. When one such pulse (e. g. produced by dialing the digit "1") is transmitted through the capacitance of a "connector" switching device, it will be found that two sharp consecutive voltage "spikes," of opposite polarity, appear in the input circuit of the called party. The first of these spikes is produced at the start of the dial pulse, while the second spike is produced at the end of the pulse. Each spike may be of only a few milliseconds or less duration.

This distortion of the dial pulse, and loss of the direct-current component, has heretofore made it virtually impossible as a practical matter to use as part of a remote dictation system those privately-owned switchboards employing "connectors." Because such a large majority of privately-owned switchboards are of this type, this limitation has seriously restricted the applicability of remote dictation systems arranged to make use of the already-available dial telephone and switchboard wiring. Various attempts have been made to solve this problem, but none of these has been satisfactory from either an operational or a commercial point of view.

Accordingly, it is an object of this invention to provide a remote dictation system that is superior to those available heretofore. It is a further object of this invention to provide such a system that is particularly adapted for use with telephone switchboard apparatus of the type having series capacitance elements in the connection established between the calling party and the called party. Other objects, advantages and aspects of the present invention will be in part apparent from, and in part pointed out in, the following specification considered together with the accompanying drawings, in which:

Figures 1A, 2, 3:
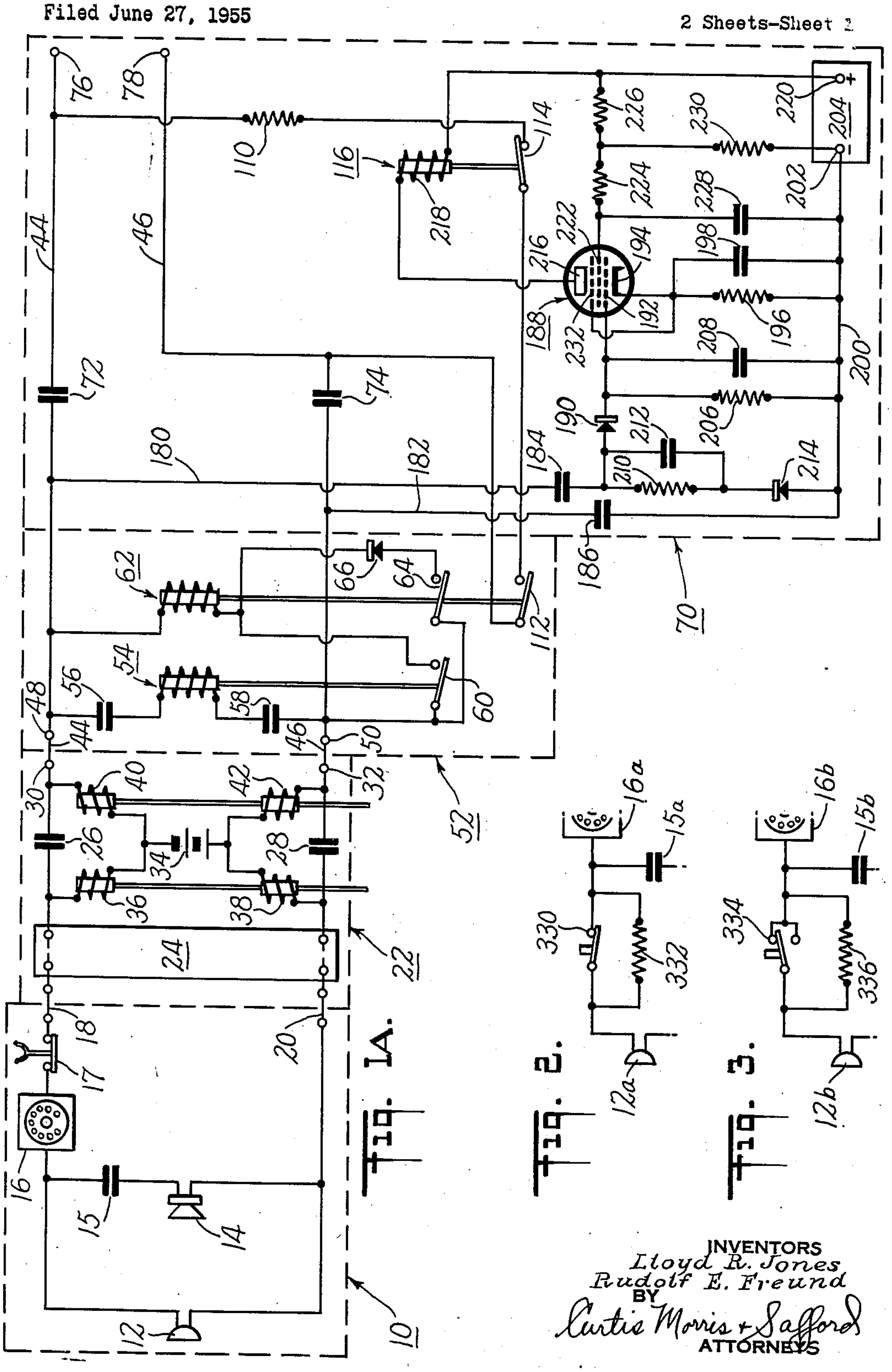
Figure 2 is a schematic diagram showing a portion of the dictator's station of Figure 1 modified to include a push-button operated, clutch-control switch arrangement.
Figure 3 is a schematic diagram showing a further clutch-control switch arrangement for use with the remote dictator's station of Figure 1.
Figure 1B:
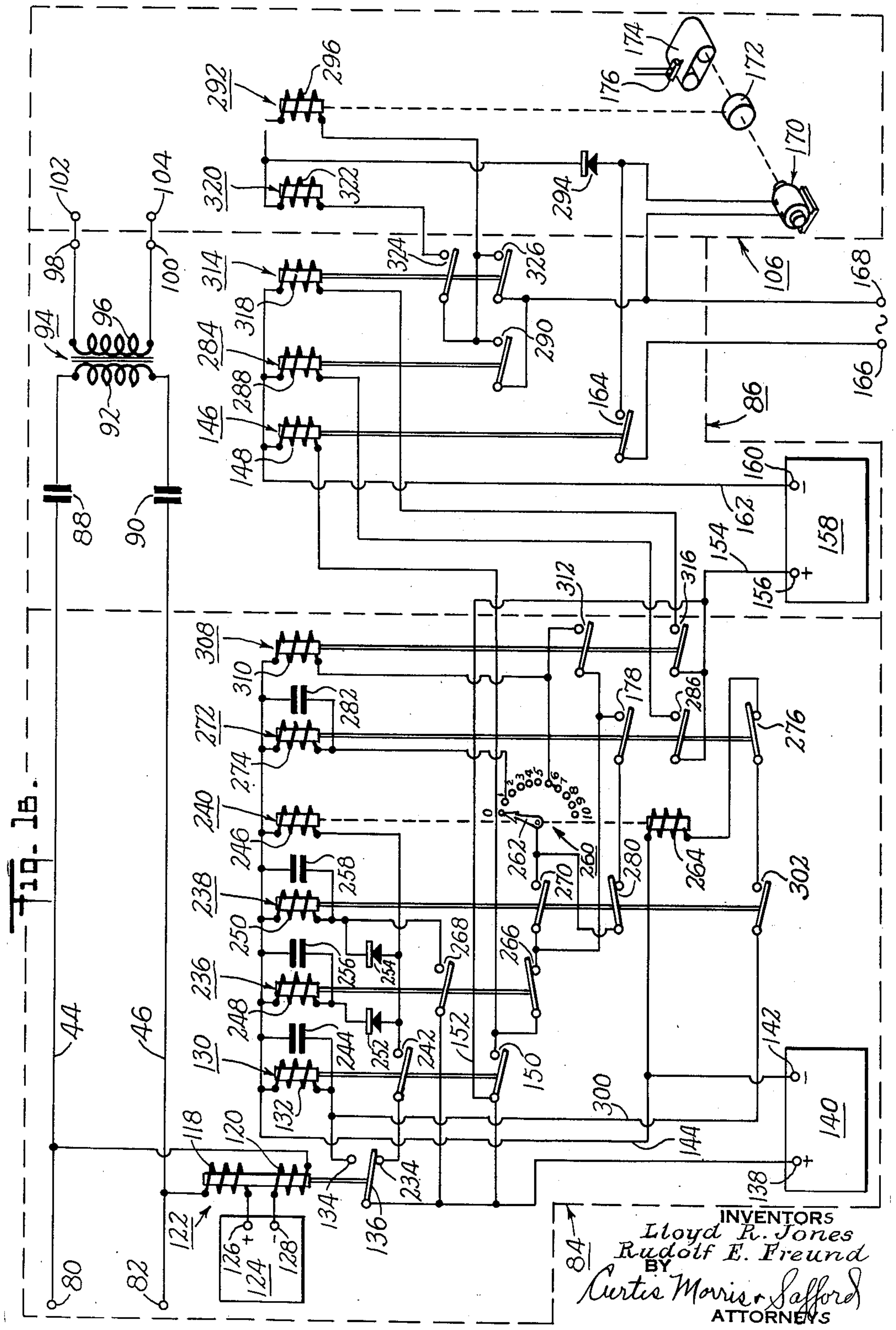
Figure 1 is a schematic diagram showing a remote dictation system, partly abbreviated, in accordance with the present invention.

Referring now to the upper left-hand corner of Figure 1, there is shown in abbreviated diagrammatic form a remote dictator's station generally indicated within the block 10, including the usual transmitter 12 and receiver 14. The receiver is coupled in parallel with the transmitter through a D.-C. blocking capacitor 15, and the paralleled units are connected, through a normally-closed, dial-operated switch 16, a cradle switch 17, and through two lines 18 and 20 to a conventional automatic switchboard generally indicated within the block 22. When the dictator has dialed the proper digits to establish connection to a remote dictating machine, lines 18 and 20 are automatically connected (by means of the usual switchboard switching apparatus generally indicated by the interior block 24, but not shown in detail herein) through corresponding capacitors 26 and 28 to a pair of switchboard output terminals 30 and 32. Bridged between the switchboard lines is the usual talking battery 34 in series with two sets of coils 36, 38, and 40, 42 of the battery-feed relays commonly provided with automatic switchboard equipment.

The output terminals 30 and 32 are connected, respectively, by corresponding lines 44 and 46 of the talking circuit, to two input terminals 48 and 50 of a line-seizure device generally indicated within the block 52. This device includes an A.-C. relay 54 in series with two D.-C. blocking capacitors 56 and 58, all bridged across the input terminals 48 and 50. When the talking circuit is completed through the switchboard 22, as explained above, the switchboard apparatus furnishes (by means not shown herein) to the line-seizure device the usual A.-C. ringing signal, and this signal energizes the A.-C. relay 54.

The consequent closure of contacts 60 of this relay 54 completes an energizing circuit for a hold-in relay generally indicated at 62, the operating current for this latter relay being provided by the talking battery 34. The hold-in relay, when thus connected across the talking circuit, is arranged to present an impedance to the switchboard terminals of approximately 250–500 ohms, thereby simulating the load presented by the telephone instrument of a called party. Consequently, the battery-feed relay is energized in the usual way and interrupts (by means of the relay contacts not shown herein) the ringing signal fed to the line-seizure device.

When the hold-in relay 62 is actuated through the A.-C. relay contacts 60, a set of latching contacts 64 are closed to complete an alternate energizing path for the hold-in relay. This path includes a rectifier 66 which is poled to pass current from the talking battery 34 when the talking circuit is first completed through to the line-seizure device, and thus the hold-in relay remains energized after the ringing signal is interrupted. When the remote dictator finishes dictation and hangs up his handset, the automatic switchboard apparatus commonly used is so arranged that the polarity of the talking battery is immediately reversed. With such a switchboard, the rectifier 66 will prevent current from flowing through the hold-in relay 62 after the dictator has hung up, and the line-seizure device 52 accordingly will be disconnected from the talking circuit to make the dictation system available to another dictator. For those installations where the switchboard is not so arranged, other means may be provided to automatically disconnect the dictating apparatus when the dictator hangs up his handset.

The talking circuit lines 44 and 46 pass through the line-seizure device 52 to a pulse-forming device generally indicated within a block 70, and through two series capacitors 72 and 74 in this latter device to a pair of output terminals 76 and 78. From there (referring now to the second sheet of drawings), the talking circuit passes through a pair of input terminals 80 and 82 of a pulse-interpreting device, generally indicated within a block 84, to a machine control unit, generally indicated within a block 86. In this latter unit, the talking circuit lines are connected through two corresponding D.-C. blocking capacitors 88 and 90 to the input winding 92 of an audio transformer generally indicated at 94. The secondary winding 96 of this transformer is connected through two control unit output terminals 98 and 100 to the usual amplifier input terminals 102 and 104 in a centrally-located dictating machine generally indicated within a block 106. This machine is shown herein in considerably abbreviated form, it being understood that any one of many types of conventional recording machines, e. g. similar to the machine apparatus described and referred to in the above-mentioned applications of Jones and Tayor, will perform satisfactorily.

Returning now to the line-seizure and pulse-forming devices, actuation of the hold-in relay 62 is arranged to connect a load resistor 110 across that portion of the talking circuit which is common to the output terminals 76 and 78, the connection to this resistor being completed through a set of contacts 112 of the hold-in relay and a set of contacts 114 of a pulse relay generally indicated at 116. With this load resistor thus connected across the talking circuit, a D.-C. energizing path is completed (referring now to the pulse-interpreting device 84) through a pair of balanced windings 118 and 120 of a line relay generally indicated at 122. The current for actuating the line relay is furnished by a D.-C. power supply generally indicated in block form at 124, having positive and negative terminals 126 and 128 connected to place the power supply in series with the line relay windings.

Actuation of the line relay 122 completes an energizing circuit for a control relay, generally indicated at 130, the current path being traced from the lower terminal of the winding 132 of this latter relay, through a fixed contact 134 and movable arm 136 of the line relay 122 to the positive terminal 138 of a D.-C. power supply generally indicated in block form at 140; and from the negative terminal 142 of this power supply along a lead 144 to the upper terminal of the relay winding 132.

Actuation of the control relay 130, in turn, completes an energizing circuit (referring now to the machine control unit 86) for an in-use relay generally indicated at 146. The current path may be traced from the lower terminal of the relay winding 148, through contacts 150 of the control relay 130, along a lead 152 and a lead 154 to the positive terminal 156 of a D.-C. power supply generally indicated in block form at 158; and from the negative terminal 160 of this power supply along a lead 162 to the upper terminal of the relay winding 148.

Actuation of the in-use relay 146 causes its contacts 164 to close, thereby completing an A.-C. power circuit, e. g. 110 volt, 60 cycle, from two terminals 166 and 168 to a drive motor generally indicated at 170 in the dictating machine 106, the rotatable shaft of which is coupled in the usual way through a clutch 172 to a mandrel arranged to support and drive a record 174 adjacent to a conventional travelling recording-reproducing head 176. By means such as described in the above-mentioned copending application of Jones and Taylor, Serial No. 457,165, actuation of the in-use relay 146 places the dictating system in what might be termed "stand-by" condition, available for use by the remote dictator who has taken control of the system, e. g. by causing proper energizing potentials to be supplied to the anodes of the machine amplifier vacuum tubes through additional in-use relay contacts not shown herein.

The necessary remote dictation control functions, such as clutch-operate, playback, correction and length-of-letter marks, etc., are set up by the remote dictator by dialing a predetermined number of digits. The pulses produced by such dialing are, however, severely distorted by the series capacitance presented by capacitors 26 and 28 in the automatic switchboard circuitry, and for that reason the embodiment of the present invention disclosed herein includes special apparatus arranged to reestablish the proper pulse shape and amplitude in order to facilitate operation of the control equipment used in conjunction with the central dictating machine.

The distorted dial pulses (i. e. consecutive, sharp voltage spikes) fed to the pulse-forming device 70 by the talking circuit lines 44 and 46 are coupled through a pair of leads 180 and 182 and corresponding D.-C. blocking capacitors 184 and 186 to the input circuit of a pentode tube generally indicated at 188. In more detail, the lower plate of the first capacitor 184 is connected through a rectifier 190 to the control grid 192 of this tube, the cathode 194 of which is connected through a bias resistor 196, in parallel with a by-pass capacitor 198, to a low-voltage line 200. This line 200 is connected to the negative terminal 202 of a D.-C. power supply generally indicated in block form at 204, and also to the lower plate of the other D.-C. blocking capacitor 186. A grid resistor 206, in parallel with a small capacitor 208 (which may, in some applications, be the input capacitance of the tube 188), is connected between the control grid 192 and the line 200. Also, the lower plate of the D.-C. blocking capacitor 184 is connected to the line 200 through a resistor 210, in parallel with a small capacitor 212, and a second rectifier 214.

Considering, for the moment, that the dictator has dialed the digit 1, a positive spike of voltage will appear across the talking circuit lines 44 and 46, followed (at the termination of the dial impulse, approximately 40 milliseconds later) by a negative spike of voltage. The initial positive spike of voltage builds up a charge on both coupling capacitors 184 and 186, and also on the tube input capacitor 208, the rectifier 190 being poled to pass current from a positive pulse. The capacitance of the input capacitor 208 is considerably less than that of the two coupling capacitors, and therefore substantially all of the peak voltage of the spike will appear across this input capacitor. After the spike subsides, the input capacitor discharges relatively slowly through the grid resistor 206, the rectifier 190 preventing flow of current back to the coupling capacitors.

The anode 216 of the tube 188 is connected through the winding 218 of the pulse relay 116 to the positive terminal 220 of the D.-C. power supply 204. When the tube input capacitor 208 is initially charged up by the first voltage spike, the control grid 192 of this tube is driven positive, and its anode current actuates the pulse relay. Consequently, contacts 114 of the pulse relay open to break the circuit connecting the resistor 110 between the talking circuit lines. The pulse relay will remain actuated until the input capacitor 208 has discharged through the grid resistor 206 to such an extent that the potential of the control grid 192 is insufficient to maintain enough anode current to hold the relay in.

The duration of actuation of the pulse relay 116 accordingly is determined by the relative magnitudes of the input capacitor 208 and the grid resistor 206, and this relationship is such that the pulse relay will be held in for a period of time approximately equal to the duration of the dial impulse created at the remote dictator's station (i. e. the time duration between the positive and negative spikes of voltage). Thus, the original dial impulse is effectively recreated at the output terminals 76 and 78 of the pulse-forming device 70, by automatically disconnecting the resistor 110 from across the talking circuit lines for a period equal to the duration of the dialing impulse. The bias on the tube 188 is adjusted (by proper selection of the cathode resistor 196) so that the sound signals transmitted over the talking circuit will not cause the pulse relay to be actuated and give a false dial pulse.

The screen grid 222 of the tube 188 is connected through two resistors 224 and 226 to the positive terminal 220 of the D.-C. power supply 204, and through a by-pass capacitor 228 to the low-voltage line 20. Also, the common connection between the resistors 224 and 226 is returned through a resistor 230 to this line 200. The suppressor grid 232 of the tube 188 is connected to its cathode 194 in the usual manner.

When the negative voltage spike, produced at the end of the dial impulse, passes through the coupling capacitors 184 and 186, it produces a current flow through the other rectifier 214 and into the capacitor 212. The charge thus built up is rapidly absorbed by the resistor 210 in parallel with this latter capacitor, and annoying "clicks" on the talking circuit are eliminated. The rectifier 214, being poled to pass only positive voltage signals, serves to block off transmission of this negative impulse to the control grid of the tube 188.

It will thus be apparent that when the remote dictator has dialed the digit 1, the dialing impulse is recreated and appears in the form of an interruption in the connection between the line resistor 110 and the output terminals 76 and 78 of the pulse-forming device 70. This interruption, of course, stops the flow of current through the windings 118 and 120 of the line relay 122 for a time substantially equal to the time duration of the dialing impulse originally created at the dictator's handset. The movable arm 136 of this latter relay accordingly is transferred momentarily from the fixed contact 134 to a second fixed contact 234, and thereby completes energizing circuits for two timing relays, generally indicated at 236 and 238, and a magnet motor generally indicated at 240.

The current path for the magnet motor 240 may be traced from the positive terminal 138 of the D.-C. power supply 140, through the movable arm 136 and fixed contact 234 of the line relay 122, through a set of contacts 242 of the control relay 130 (which is maintained in actuated condition for the duration of the dial impulse by a capacitor 244 in parallel with the relay winding 132), through the magnet motor winding 246, nad back along lead 144 to the negative terminal 142 of the D.-C. power supply. The current path for the timing relay windings 248 and 250 is identical to that just described, except that each of these windings is connected in series with a corresponding rectifier 252 and 254.

Each of the timing relay windings 248 and 250 is connected in parallel with respective capacitors 256 and 258 which maintain the timing relays in actuated condition for a short time after their energizing circuits are interrupted by re-actuation of the line relay 122 at the end of the dialing impulse. The rectifiers 252 and 254 serve to isolate these capacitors from the magnet motor winding 246, so that the magnet motor is immediately deactuated when its energizing circuit is interrupted.

The magnet motor 240 forms part of a stepping relay generally indicated at 260, which includes a rotary arm 262 adapted to make contact with any one of a series of terminals identified with the numbers 1, 2, 3, etc. This stepping relay may be any one of a number of types known heretofore, such as commonly are used in automatic telephone switchboard apparatus, and is so arranged that the rotary arm 262 advances one step (i. e. one terminal) for each energization of the magnet motor. Such a stepping relay also is provided with a ratchet mechanism (not shown) which is arranged to hold the rotary arm 262 at the terminal contact of its farthest advance. A ratchet release mechanism (not shown) also is provided and is arranged to permit the movable arm to return, under spring tension, to its starting position (as shown) when a ratchet release winding 264 is energized as described below.

Accordingly, when the remote dictator has dialed the digit 1, the magnet motor 240 is actuated during the dialing impulse and, considering that the rotary arm 262 of the stepping relay 260 is in its initial, or zero, position, this arm will be advanced one step to make contact with terminal No. 1. This rotary arm will remain in contact with terminal No. 1 until the ratchet mechanism is released (by energization of release winding 264) to permit it to return to its initial position.

When the dialing pulse has subsided, the line relay 122 will be re-energized and the movable arm 136 thereof will be transferred back to the fixed contact 134 to break the energizing circuit for the timing relays 236 and 238. Shortly after the termination of the dial pulse (the amount of delay time being determined by the capacitor 256 in parallel with the relay winding 248), the first timing relay 232 will drop out, thereby closing one set of its contacts 266. The second timing relay 238 is provided with an alternate energizing path through another set of contacts 268 of the first timing relay, so that the second timing relay will remain in actuated condition for a short period of time (the amount of delay time being determined by the capacitor 258 in parallel with the relay winding 250) after the first timing relay has dropped out. Consequently, contacts 266 of the first timing relay will be closed, for a short period of time, while a set of contacts 270 of the second timing relay also are closed; this concurrence of closure occurs only momentarily, shortly after the end of the dial pulse.

As a result, an energizing circuit momentarily is completed to a clutch control relay generally indicated at 272, the current path being traced from the positive terminal 138 of the D.-C. power supply 140, through contacts 150 of the control relay 130 (which remains actuated during the pulse by virtue of the capacitor 244 in parallel with the relay winding 132), through contacts 266 of the first timing relay 236, through contacts 270 of the second timing relay 238, through the rotary arm 262 of the stepping relay 260 to terminal No. 1, through the winding 274 of the clutch control relay 272, and back along lead 144 to the negative terminal 142 of the D.-C. power supply.

Energization of the clutch control relay 272 opens a set of its contacts 276 in series with the ratchet release winding 264, thereby preventing energization of the ratchet release mechanism when the line relay 122 again becomes energized at the termination of the dial pulse. With this latching arrangement, the rotary arm 262 will, whenever it has been placed in contact with terminal No. 1 of the stepping relay, remain in that position until advanced to one of the other terminals. Energization of the clutch control relay 272 also closes a second set of its contacts 278, which completes an alternate energizing circuit, including a set of contacts 280 of the second timing relay 238, around the contacts 270 of this second timing relay. Thus, when the second timing relay eventually drops out after the pulse has subsided, the energizing circuit for the clutch control relay winding 274 will be maintained through this alternate path. The winding of the clutch control relay is provided with a parallel capacitor 282 to assure that this relay remains actuated while its energizing circuit is being switched to the alternate path.

Energization of the clutch control relay 272, in turn, energizes a clutch relay generally indicated at 284, located in the dictating machine control unit 86. The current path for this relay may be traced from the positive terminal 156 of the D.-C. power supply 158 along lead 154, through a set of contacts 286 of the clutch control relay 272, through the winding 288 of the clutch relay 284, and back along the lead 162 to the negative terminal 160 of the D.-C. power supply.

The consequent closure of contacts 290 of the clutch relay 284 completes the power circuit for a clutch solenoid generally indicated at 292, located in the dictating machine 106. This circuit may be traced from one A.-C. input terminal 166, through the in-use relay contacts 164, through a rectifier 294, through the clutch solenoid winding 296, through contacts 290 of the clutch relay 284, and back to the other A.-C. input terminal 168. The consequent energization of the clutch solenoid is arranged (by means not shown herein) to activate the clutch 172 and start the record 174 moving past the recording head 176 in accordance with rotary motion supplied by the drive motor 170. Thus, the remote dictator, by dialing the digit 1, places the dictating machine in condition to record.

When the remote dictator desires to interrupt his dictation, he need only dial the digit 1 once again. The dialing impulse thus created activates, in the manner described hereinabove, the magnet motor 240 to advance the rotary arm 262 of the stepping relay 260 to terminal No. 2. This, in turn, interrupts the current path through the clutch control relay 272, and the consequent deactivation of this relay causes the clutch relay 284 to drop out; hence solenoid 292 becomes de-energized and the record motion stops.

It may also be noted that deactivation of the clutch control relay 272 causes its contacts 276 in series with the ratchet release winding 264 to close. Thus, as soon as the second timing relay 238 drops out after the dial pulse has ended, the ratchet release mechanism becomes energized and permits the rotary arm 262 of the stepping relay 260 to return to its initial position. The current path for the ratchet release winding 264 may be traced from the positive terminal 138 of the D.-C. power supply 140, through the movable arm 136 and fixed contact 134 of the line relay 70, along a lead 300, through a set of contacts 302 of the second timing relay 238, through contacts 276 of the clutch control relay 272, through the ratchet release winding 264, and back to the negative terminal 142 of the D.-C. power supply.

If the dictator now desires to play back a portion of the recorded material, he will dial the digit 6. In the manner described above, the pulse-forming device 70 will produce a corresponding train of simulated dial pulses by causing contacts 114 of the pulse relay 116 to be opened and closed 6 successive times. Accordingly, the line relay 122 will be de-actuated and re-actuated 6 successive times, and, consequently, the magnet motor 240 will advance the stepping relay 260 until the rotary arm of this relay makes contact with terminal No. 6.

When the first pulse of this train is sensed by the line relay 122, the timing relays 236 and 238 will immediately be actuated. And, because the windings of these relays are connected in parallel with corresponding capacitors 256 and 258, these relays will remain actuated throughout the period of time represented by the train of dialing impulses. Consequently, the contacts 302 of the second timing relay 238 remain open during this time, so that the ratchet release mechanism remains de-energized and prevents the rotary arm 262 from returning to its initial position between each individual pulse. Shortly after the termination of this train of pulses, both timing relays will again become de-actuated, one after the other, in the manner described hereinabove with respect to the single dial pulse.

When the first timing relay 236 drops out, the stepping relay 260 will be on terminal No. 6, and an energizing circuit will momentarily be established for a playback control relay generally indicated at 308. The current path for this relay may be traced from the positive terminal 138 of the D.-C. power supply 140, through contacts 150 of the control relay 130, through contacts 266 of the first timing relay 236, through contacts 270 of the second timing relay 238, through the rotary arm 262 and terminal No. 6 of the stepping relay 260, through the winding 310 of the playback control relay 308, and back along lead 144 to the negative terminal 142 of the D.-C. power supply.

Actuation of the playback control relay 308 closes a set of latching contacts 312 which complete an alternate energizing circuit for this relay, around the second timing relay contacts 270 and the stepping relay 260. Thus, when the second timing relay eventually drops out, and the stepping relay arm 262 returns to its initial position upon energization of the ratchet release mechanism, the playback control relay remains energized through the alternate path established by its latching contacts 312.

Actuation of the playback control relay 308 also establishes an energizing circuit for a playback relay, located in the dictating machine control unit 86, and generally indicated at 314. The current path for this relay may be traced from the positive terminal 156 of the D.-C. power supply 158, through contacts 316 of the playback control relay 308, through the winding 318 of the playback relay 314, and back along lead 162 to the negative terminal 160 of the D.-C. power supply.

Actuation of the playback relay 314, in turn, establishes an energizing circuit for a playback solenoid generally indicated at 320 and forming part of the dictating machine. Operation of the playback solenoid causes (by means not shown herein, but which may be similar to known arrangements used for this purpose) the dictating machine to be conditioned for playback operation. The current path for this solenoid may be traced from one A.-C. input terminal 166, through the in-use relay contacts 164, through the rectifier 294, through the winding 322 of the playback solenoid 320, through contacts 324 and 326 of the playback relay 314, and back to the other A.-C. input terminal 168.

Since the record must be driven during playback, provision also is made for activating the clutch solenoid 292 during the time that the playback solenoid is energized. The current path for the clutch solenoid in this situation may be traced from one A.-C. input terminal 166, through the in-use relay contacts 164 and the rectifier 294, through the clutch solenoid winding 296, through the playback relay contacts 326, and back to the other A.-C. input terminal 168.

When the remote dictator desires to stop the playback operation, he will dial another digit such as 1 or 2. The consequent actuation of the first timing relay 236 causes its contacts 266 to open and thereby break the energizing circuit to the playback control relay 308. When this relay is thus deenergized its latching contacts 312 open, and the current path for the playback control relay winding 310 cannot be reestablished without again dialing to obtain the playback function.

It may be noted that terminals 6 and 7 of the stepping relay 260 are connected together. This is to permit operation of the playback function by dialing the digit 6 regardless of whether the stepping relay is in its initial position or in its clutch-operate position (i. e. on terminal No. 1). That is, if the stepping relay arm 262 is in contact with terminal No. 1, dialing 6 for playback will advance this arm to terminal No. 7; and, since terminal No. 7 is connected to terminal No. 6, the playback function desired will be obtained just as when the arm 262 is moved to terminal No. 6 from its zero position by dialing 6.

The system described hereinabove is somewhat abbreviated in that it includes provision for remote control of only the recording machine clutch and playback function mechanisms. It will be apparent, however, that a commercial remote dictation system in accordance with the present invention will generally also include circuit arrangements to permit the dictator to control other conventional functions, such as making correction and length-of-letter marks on the indicator slip associated with most recording machines, signaling the attendant at the machine, etc. For this purpose, the terminals of the stepping relay 260 that are shown in Figure 1 as vacant may be connected to additional control relays arranged similarly to those already described, and which, when energized, produce the desired functions in the recording machine. Thus, the dictator may obtain any one of the other functions merely by dialing a digit corresponding to the appropriate stepping relay terminal, e. g. by dialing 4, 5, 8, etc.

In some applications, it is preferred that the clutch-operate function be obtained by depressing a button on the telephone handset, rather than by operating the telephone dial. This can be accomplished by the arrangements shown in Figures 2 and 3, which represent modifications to the remote dictation station 10 shown in Figure 1.

In Figure 2, a push-button switch 330 is shown connected in series with the telephone transmitter **12*a*, the contacts of this switch being bridged by a resistor 332 which has a resistance of about 1500 to 4000 ohms. When the dictator desires to dictate, he presses and releases the handset push-button which causes the switch to open momentarily. The current in the telephone lines leading to the switchboard is reduced during the time of switch operation, since the resistance of the bridging resistor 332 is higher than that of the dictator's telephone. This reduction in current creates a voltage impulse, similar to that produced by operation of the dial, which is transmitted through the switchboard apparatus 22 (in Figure 1) to the pulse-forming device 70. This latter device, in turn, generates a corresponding pulse of the proper magnitude and duration which, in the manner explained hereinabove, causes the clutch mechanism 172 in the recording machine 106** to operate.

To disengage the machine clutch, the switch 330 is depressed and released a second time, which creates another voltage impulse. This impulse, as explained above, moves the stepping relay 260 to terminal No. 2, and accordingly the clutch mechanism is deenergized. The bridging resistor 332 is provided to assure that, if the dictator inadvertently holds his push-button down, sufficient current will flow in the talking circuit lines 18 and 20 to hold the switchboard relays in and thus maintain the connection between the dictator's station and the switchboard.

Figure 3 shows a further modification to the dictator's station wherein the dictating machine clutch is energized by pressing a push-button switch 334 and deenergized when this switch is released. For this purpose, the handset switch is provided with a movable arm which, when the button is depressed, is shifted between two fixed contacts that are connected together.

During the time of transfer between these contacts, the line current is momentarily decreased to create a voltage impulse which actuates the machine clutch as previously explained. When the switch is released, a second impulse will be created to de-energize the clutch. The switch 334 is provided with a bridging resistor 336 as in Figure 2.

Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as meet the requirements of particular applications, it being understood that various modifications may be made without departing from the scope of the invention as limited by the prior art.

We claim:

1. A remote dictation system comprising, in combination, a plurality of remote dictator's stations each including sound transducing apparatus and a dial-operated switch, telephone switchboard apparatus of the type including series capacitance in the connection established between a calling party and a selected line, circuit means for connecting said dictator's stations to said switchboard apparatus, a centrally-located recording machine having a movable record and a recording head arranged for relative travelling movement, said machine also including at least one operating element arranged when actuated to accomplish a predetermined function relating to operation of the machine for dictation purposes, a talking circuit coupling said recording machine to said switchboard apparatus in such a manner that said switchboard may be conditioned to establish a sound channel between one of said remote dictator's stations and said machine, pulse-generating means coupled to said talking circuit and arranged when activated by dial impulses transmitted through said switchboard from one of said dictator's stations to produce corresponding pulses simulating the original dial impulses produced at said one dictator's station, and control means responsive to said pulses and arranged to actuate said operating element in said machine when a predetermined number of dial impulses has been produced at said one dictator's station.

2. A remote dictation system comprising, in combination, a plurality of remote dictator's stations each including sound transducing apparatus and a dial-operated switch, telephone switchboard apparatus of the type including series capacitance in the connection established between a calling party and a selected line, circuit means for connecting said dictator's stations to said switchboard apparatus, a centrally-located dictating machine having a movable record and a recording head arranged for relative travelling movement, said machine also including a plurality of operating elements each of which is arranged when actuated to perform a predetermined function pertaining to operation of the machine, a talking circuit connecting said dictating machine to said switchboard apparatus in such a manner that said switchboard is enabled to establish a sound channel between any one of said remote dictator's stations and said dictating machine, pulse-generating means coupled to said talking circuit arranged to be activated by distorted dial impulses transmitted through the capacitance in said switchboard from one of said dictator's stations, an input circuit for said pulse-generating means, timing means associated with said pulse-generating means for fixing the duration of pulses produced in said output circuit so that said pulses simulate the original dial impulses produced at said one dictator's station, and machine control means coupled to said output circuit, said control means being responsive to said pulses and arranged to actuate a selected one of said operating elements in said dictating machine in accordance with the number of consecutive dial impulses produced at said one dictator's station.

3. A remote dictation system comprising, in combination, a plurality of remote dictator's stations each including sound transducing apparatus and a dial-operated switch, telephone switchboard apparatus of the type including series capacitance in the connection established between a calling party and a selected line, circuit means for connecting said dictator's stations to said switchboard apparatus, a centrally-located recording machine having a movable record and a recording head arranged for relative travelling movement, said machine also including at least one operating element arranged when actuated to accomplish a predetermined function relating to operation of the machine for dictation purposes, a talking circuit coupling said recording machine to said switchboard apparatus in such a manner that said switchboard may be conditioned to establish a sound channel between one of said remote dictator's stations and said machine, said talking circuit comprising first and second portions coupled together through D.-C. blocking capacitance means, pulse-generating means coupled to the first portion of said talking circuit and arranged when activated by dial impulses transmitted through said switchboard from one of said dictator's stations to produce in the second portion of said talking circuit corresponding pulses simulating the original dial impulses produced at said one dictator's station, and control means connected to the second portion of said talking circuit, said control means being responsive to said pulses and arranged to actuate said operating element in said machine when a predetermined number of dial impulses has been produced at said one dictator's station.

4. A remote dictation system comprising, in combination, a plurality of remote dictator's stations each including an on-off switch, a sound transducing device and a dial-operated switch; telephone switchboard apparatus of the type including series capacitance in the connection established between a calling party and a selected line, circuit means for connecting said dictator's stations to said switchboard apparatus, a centrally-located dictating machine having a movable record and a recording head arranged for relative travelling movement, said machine also including a plurality of operating elements each arranged when actuated to accomplish a desired function relating to operation of the machine for dictation purposes, a talking circuit connecting said dictating machine to said switchboard apparatus in such a manner that said switchboard is enabled to establish a sound channel connection between one of said remote dictator's stations and said dictating machine, line-seizure apparatus coupled to said talking circuit to maintain said switchboard connected to said talking circuit while said on-off switch is positioned for dictation, pulse-generating means coupled to said talking circuit and arranged when activated by dial impulses transmitted through said switchboard from one of said dictator's stations to produce corresponding pulses simulating the original dial impulses produced at said one dictator's station, and control means responsive to said pulses and arranged to actuate a selected operating element in said dictating machine in accordance with the number of consecutive dial impulses produced at said one dictator's station.

5. A remote dictation system comprising, in combination, a plurality of remote dictator's stations each including an on-off switch, sound transducing apparatus and a dial-operated switch; telephone switchboard apparatus of the type including series capacitance in the connection established between a calling party and a selected line, circuit means for connecting said dictator's stations to said switchboard apparatus, a centrally-located dictating machine having a movable record and a recording head arranged for relative travelling movement, said machine also including a clutch mechanism for transmitting power to said record and an operating element arranged when actuated to activate said clutch mechanism, a talking circuit connecting said dictating machine to said switchboard apparatus in such a manner that said switchboard is operable to establish a sound channel connection between any one of said remote dictator's stations and said dictating machine, line-seizure apparatus coupled to said talking circuit to maintain said switchboard connected to said talking circuit while said on-off switch is positioned for dictation, pulse-generating means coupled to said talking circuit and arranged when activated by dial impulses transmitted through said switchboard from one of said dictator's stations to produce corresponding pulses simulating the original dial impulses produced at said one dictator's station, and control means responsive to said pulses, said control means being arranged to actuate said operating element in said dictating machine when a single pulse is produced by said pulse-generating means in response to the transmission of a single impulse through said switchboard apparatus.

6. A remote dictation system comprising, in combination, a plurality of remote dictator's stations each including sound transducing apparatus and a dial-operated switch, telephone switchboard apparatus of the type including series capacitance in the connection established between a calling party and a selected line, circuit means for connecting said dictator's stations to said switchboard apparatus, a centrally-located dictating machine having a movable record and a recording head arranged for relative travelling movement, said machine also including a plurality of operating elements each of which is arranged when actuated to provide a predetermined control function in the machine, a talking circuit connecting said dictating machine to said switchboard apparatus in such a manner that said switchboard is enabled to establish a sound channel between one of said remote dictator's stations and said dictating machine, pulse-generating means coupled to said talking circuit and arranged when actuated by dial impulses transmitted through said switchboard from one of said dictator's stations to produce corresponding pulses simulating the original dial impulses produced at said one dictator's station, said pulse-generating means including a current-control device activated by the initial voltage wave-front of each of said dial impulses and arranged to remain activated for a period of time approximately equal to the duration of each impulse, and control means responsive to the output of said pulse-generating means for actuating a selected one of said operating elements in said dictating machine in accordance with the number of consecutive dial impulses produced at said one dictator's station.

7. A remote dictation system comprising, in combination, a plurality of remote dictator's stations each including sound transducing apparatus and a dial-operated switch, telephone switchboard apparatus of the type including series capacitance in the connection established between a calling party and a selected line, circuit means for connecting said dictator's stations to said switchboard apparatus, a centrally-located dictating machine having a movable record and a recording head arranged for relative travelling movement, said machine also including a plurality of operating elements each of which is arranged when actuated to perform a predetermined function relating to operation of the machine, a talking circuit connecting said dictating machine to said switchboard apparatus in such a manner that said switchboard may be conditioned to establish a sound channel between one of said remote dictator's stations and said dictating machine, pulse-generating means coupled to said talking circuit and arranged when activated by dial impulses transmitted through said switchboard from one of said dictator's stations to produce corresponding pulses simulating the original dial impulses produced at said one dictator's station, electrical energy storage and discharge means associated with said pulse-generating means and arranged to control the time duration of said pulses so as to approximate the time duration of the original impulses, and control means responsive to said pulses for actuating a selected one of said operating elements in said dictating machine in accordance with the number of consecutive dial impulses produced at said one dictator's station.

8. A remote dictation system comprising, in combination, a plurality of remote dictator's stations each including an on-off switch, sound-transducing device and a push-button switch; telephone switchboard apparatus of the type including series capacitance in the connection established between a calling party and a selected line, circuit means for connecting said dictator's stations to said switchboard apparatus, said push-button switch being arranged to interrupt the connection between the corresponding sound transducing device and said circuit means, a centrally-located dictating machine having a movable record and a recording head arranged for relative travelling movement, said machine also including a clutch mechanism for transmitting power to said record and an operating element arranged when actuated to activate said clutch mechanism, a talking circuit connecting said dictating machine to said switchboard apparatus in such a manner that said switchboard is operable to establish a sound channel connection between any one of said remote dictator's stations and said dictating machine, line-seizure apparatus coupled to said talking circuit to maintain said switchboard connected to said talking circuit while said on-off switch is positioned for dictation, pulse-generating means coupled to said talking circuit and arranged when activated by impulses transmitted through said switchboard in response to the operation of the push-button in said dictator's stations to produce corresponding pulses simulating dial impulses produced by a conventional telephone desk-set, and control means responsive to said pulses, said control means being arranged to actuate said operating element in said dictating machine when a single pulse is produced by said pulse-generating means in response to the operation of one of said push-buttons.

9. A remote dictation system comprising, in combination, a plurality of remote dictator's stations each including sound transducing apparatus and a dial-operated switch, telephone switchboard apparatus of the type including series capacitance in the connection established between a calling party and a selected line, circuit means for connecting said dictator's stations to said switchboard apparatus, a centrally-located dictating machine having a movable record and a recording head arranged for relative travelling movement, said machine also including a plurality of operating elements each of which is arranged when actuated to perform a predetermined function pertaining to operation of the machine, a talking circuit connecting said dictating machine to said switchboard apparatus in such a manner that said switchboard is enabled to establish a sound channel between any one of said remote dictator's stations and said dictating machine, said talking circuit having first and second portions connected together through capacitance means, pulse-generating means coupled to the first portion of said talking circuit and arranged to be activated by distorted dial impulses transmitted through the capacitance in said switchboard from one of said dictator's stations, an output circuit for said pulse-generating means coupled to the second portion of said talking circuit, timing means forming a part of said pulse-generating means and responsive to the initial voltage wave-front of a dial impulse transmitted through said switchboard, said timing means being adapted to determine the duration of pulses produced in said output circuit so that said pulses simulate the original dial impulses produced at said one dictator's station, and machine control means coupled to the second portion of said talking circuit, said control means being responsive to said pulses and arranged to actuate a selected one of said operating elements in said dictating machine in accordance with the number of consecutive dial impulses produced at said one dictator's station.

10. A remote dictation system comprising, in combination, a plurality of remote dictator's stations each comprising a telephone-type desk-set including a microphone, a receiver, an on-off switch, and a dial-operated switch; telephone switchboard apparatus of the type including series capacitance in the connection established between a calling party and a selected line, circuit means for connecting said dictator's stations to said switchboard apparatus, a centrally-located dictating machine having a movable record and a recording head arranged for relative travelling movement, said machine also including a plurality of operating elements each arranged when actuated to condition said machine for a desired mode of operation, a talking circuit connecting said dictating machine to said switchboard apparatus in such a manner that said switchboard is enabled to establish a sound channel between one of said remote dictator's stations and said dictating machine, a pulse-generating means coupled to said talking circuit and arranged when activated by dial impulses transmitted through said switchboard from one of said dictator's stations to produce corresponding pulses simulating the original dial impulses produced at said one dictator's station, and control means including a magnet motor and a stepping relay responsive to said pulses arranged to establish energizing connection to a selected operating element in said dictating machine in accordance with the number of consecutive dial impulses produced at said one dictator's station.

11. A remote dictation system comprising, in combination, a plurality of remote dictator's stations each including sound transducing apparatus and a dial-operated switch, telephone switchboard apparatus of the type including series capacitance in the connection established between a calling party and a selected line, circuit means for connecting said dictator's stations to said switchboard apparatus, a centrally-located dictating machine having a movable record and a recording head arranged for relative travelling movement, said machine also including a plurality of operating elements each of which is arranged when actuated to provide a predetermined control function in the machine, a talking circuit connecting said dictating machine to said switchboard apparatus in such a manner that said switchboard is enabled to establish a sound channel between one of said remote dictator's stations and said dictating machine, pulse-generating means coupled to said talking circuit and arranged when actuated by dial impulses transmitted through said switchboard from one of said dictator's stations to produce corresponding pulses simulating the original dial impulses produced at said one dictator's station, said pulse-generating means including a current-control device activated by the initial voltage wave-front of each of said dial impulses and arranged to remain activated for a period of time approximately equal to the duration of each impulse, an impedance element connectible across said talking circuit, switch means under the influence of said current-control device for interrupting the connection to said impedance element while said current-control device remains activated, and control means responsive to the interruption of said connection and arranged to actuate a selected one of said operating elements in said dictating machine in accordance with the number of consecutive dial impulses produced at said one dictator's station.

12. A remote dictation system comprising, in combination, a plurality of remote dictator's stations each including sound transducing apparatus and a dial-operated switch, telephone switchboard apparatus of the type including series capacitance in the connection established between a calling party and a selected line, circuit means for connecting said dictator's stations to said switchboard apparatus, a centrally-located dictating machine having a movable record and a recording head arranged for relative travelling movement, said machine also including a plurality of operating elements each of which is arranged when actuated to perform a predetermined function relating to operation of the machine, a talking circuit connecting said dictating machine to said switchboard apparatus in such a manner that said switchboard may be conditioned to establish a sound channel between one of said remote dictator's stations and said dictating machine, said talking circuit comprising first and second portions interconnected by capacitance elements, pulse-generating means coupled to the first portion of said talking circuit and arranged when activated by dial impulses transmitted through said switchboard from one of said dictator's stations to produce in the second portion of said talking circuit corresponding pulses simulating the original dial impulses produced at said one dictator's station, resistance-capacitance discharge means associated with said pulse-generating means and arranged to control the time duration of said pulses so as to substantially equal the time duration of the original impulses, and control means responsive to said simulated pulses and arranged to actuate a selected one of said operating elements in said dictating machine in accordance with the number of consecutive dial impulses produced at said one dictator's station.

13. A remote dictation system comprising, in combination, a plurality of remote dictator's stations each including an on-off switch, a sound-transducing device and a push-button switch; conventional telephone switchboard apparatus for establishing connection between a calling party and a selected line, circuit means for connecting said dictator's stations to said switchboard apparatus, each of said push-button switches being arranged when actuated to interrupt the connection between said circuit means and the sound-transducing device in the respective dictator's station and thereby to transmit a single pulse to said switchboard, a centrally located dictating machine having a movable record and a recording head arranged for travelling movement relative thereto, said machine also including a clutch mechanism for transmitting power to said record and an operating element arranged when actuated to activate said clutch mechanism, a talking circuit connecting said dictating machine to said switchboard apparatus in such a manner that said switchboard is operable to establish a sound channel connection between any one of said remote dictator's stations and said dictating machine, line seizure apparatus coupled to said talking circuit to maintain said switchboard connected to said talking circuit while said on-off switch is positioned for dictation, pulse control means forming part of said system and arranged to assure that pulses developed in said talking circuit in response to actuation of said push-button have a duration substantially equal to pulses produced by operation of the dial of a conventional dial telephone, and function control means responsive to pulses in said talking circuit, said function control means being arranged to actuate said operating element in said dictating machine when a single pulse is produced in response to the actuation of one of said push-buttons.

14. A remote dictation system comprising, in combination, a plurality of remote dictator's stations each including an on-off switch, a sound-transducing device and a push-button switch, conventional telephone switchboard apparatus for establishing connection between a calling party and a selected line, circuit means for connecting said dictator's stations to said switchboard apparatus, each of said push-button switches including a manually-movable contact and a pair of fixed contacts selectively engageable by said movable contact, each of said push-button switches being arranged such that while the movable contact thereof is being transferred from one of said fixed contacts to the other of said fixed contacts the connection between said circuit means and the sound-transducing device in the respective dictator's station is effectively interrupted, whereby a single impulse is transmitted to said switchboard, a centrally-located dictating machine having a movable record and a recording head arranged for travelling movement relative thereto, said machine also including a clutch mechanism for transmitting power to said record and an operating element arranged when actuated to activate said clutch mechanism, a talking circuit connecting said dictating machine to said switchboard apparatus in such a manner that said switchboard is operable to establish a sound channel connection between any one of said remote dictator's stations and said dictating machine, pulse control means forming part of said system and arranged to assure that pulses developed in said talking circuit in response to actuation of any of said push-buttons have a duration substantially equal to pulses produced by operation of the dial of a conventional dial telephone regardless of the length of time said movable contact is out of engagement with said fixed contacts, and function control means responsive to pulses in said talking circuit, said function control means being arranged to actuate said operating element in said dictating machine when a single pulse is produced in response to the actuation of one of said push-buttons.

15. A remote dictation system comprising, in combination, a plurality of remote dictator's stations each including an on-off switch, a sound-transducing device and a push-button switch, conventional telephone switchboard apparatus for establishing connection between a calling party and a selected line, circuit means for connecting said dictator's stations to said switchboard apparatus, each of said push-button switches including a manually-movable contact and a pair of fixed contacts selectively engageable by said movable contact, each of said push-button switches being arranged such that while the movable contact thereof is being transferred from one of said fixed contacts to the other of said fixed contacts the connection between said circuit means and the sound-transducing device in the respective dictator's station is effectively interrupted, whereby a single impulse is transmitted to said switchboard, electrical resistance means permanently connected between said movable contact and said fixed contacts so that when said movable contact is disengaged from both of said fixed contacts a small amount of current still may flow between said circuit means and the respective sound-transducing device, a centrally-located dictating machine having a movable record and a recording head arranged for travelling movement relative thereto, said machine also including a clutch mechanism for transmitting power to said record and an operating element arranged when actuated to activate said clutch mechanism, a talking circuit connecting said dictating machine to said switchboard apparatus in such a manner that said switchboard is operable to establish a sound channel connection between any one of said remote dictator's stations and said dictating machine, pulse control means forming part of said system and arranged to assure that pulses developed in said talking circuit in response to actuation of any of said push-buttons have a duration substantially equal to pulses produced by operation of the dial of a conventional dial telephone regardless of the length of time said movable contact is out of engagement with said fixed contacts, and function control means responsive to pulses in said talking circuit, said function control means being arranged to actuate said operating element in said dictating machine when a single pulse is produced in response to the actuation of one of said push-buttons.

References Cited in the file of this patent

UNITED STATES PATENTS 2,200,351 Whitehead -------------- May 14, 1940